United States Patent [19]

Watanabe

[11] Patent Number: 5,684,833
[45] Date of Patent: Nov. 4, 1997

[54] MUTUAL CONVERSION METHOD OF BINARY DATA AND MULTILEVEL SIGNAL, ITS COMMUNICATION METHOD, AND ITS RECEIVING DEVICE

[75] Inventor: Hirofumi Watanabe, Kani, Japan

[73] Assignee: Aichidenshi Kabushiki Kaisha, Nagoya, Japan

[21] Appl. No.: 425,984

[22] Filed: Apr. 20, 1995

[30] Foreign Application Priority Data

| Apr. 21, 1994 | [JP] | Japan | 6-107958 |
| Jul. 12, 1994 | [JP] | Japan | 6-185492 |
| Sep. 22, 1994 | [JP] | Japan | 6-254390 |
| Oct. 24, 1994 | [JP] | Japan | 6-284192 |

[51] Int. Cl.$^6$ ............................ H04L 25/34
[52] U.S. Cl. ............................ 375/286; 341/56
[58] Field of Search .............. 341/56, 57, 58; 375/286, 287, 293

[56] References Cited

U.S. PATENT DOCUMENTS

| 4,006,416 | 2/1977 | Pastan et al. | 375/286 |
| 4,347,619 | 8/1982 | Dakin et al. | 375/286 |
| 4,408,189 | 10/1983 | Betts et al. | 341/56 |
| 4,473,820 | 9/1984 | Bechtner | 341/56 |
| 4,475,212 | 10/1984 | McLean et al. | 375/286 |
| 4,528,550 | 7/1985 | Graves et al. | 341/56 |
| 4,841,301 | 6/1989 | Ichihara | 341/57 |
| 4,897,854 | 1/1990 | Harris et al. | 341/57 |
| 4,910,750 | 3/1990 | Fisher | 341/57 |

*Primary Examiner*—Stephen Chin
*Assistant Examiner*—Joseph Roundtree
*Attorney, Agent, or Firm*—Oblon, Spivak, McClelland, Maier & Neustadt, P.C.

[57] ABSTRACT

A method for converting binary data into a multilevel signal where the binary data includes m data, or symbols, per group unit which have n bits per data. The multilevel signal includes m time slots, or symbol periods, and m+1 levels per basic period. The m time slots include 0th to m−1 slots. The m+1 levels include 0th to m−1th levels and an upper standard level above the m−1th level. The basic period is alternately and consecutively defined as A type and B type. A type data at a predetermined location is defined as an index data. When the binary data is converted into the multilevel signal, the index data is assigned to the Tth time slot taking the 0th level in the A type basic period and upper standard level in the B type basic period corresponding to a value T of the original index data in binary digit. Other binary data j, or normal data, are allocated to each time slots except the Tth time slot for the index data after converted into the multilevel signal with level values $L_j+1$ being shifted up by one level in the A type basic period and with level values $L_j$ in the B type basic period without being shifted. As a result, transmission efficiency is improved.

18 Claims, 11 Drawing Sheets

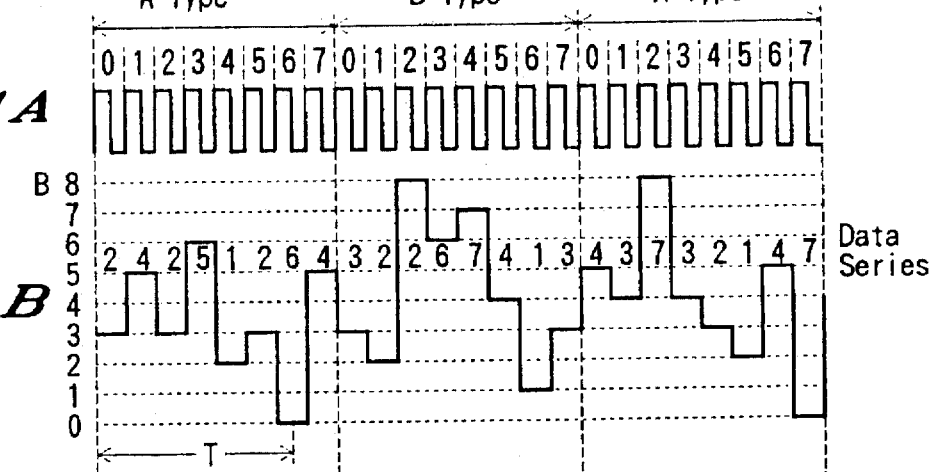
FIG. 1A
FIG. 1B
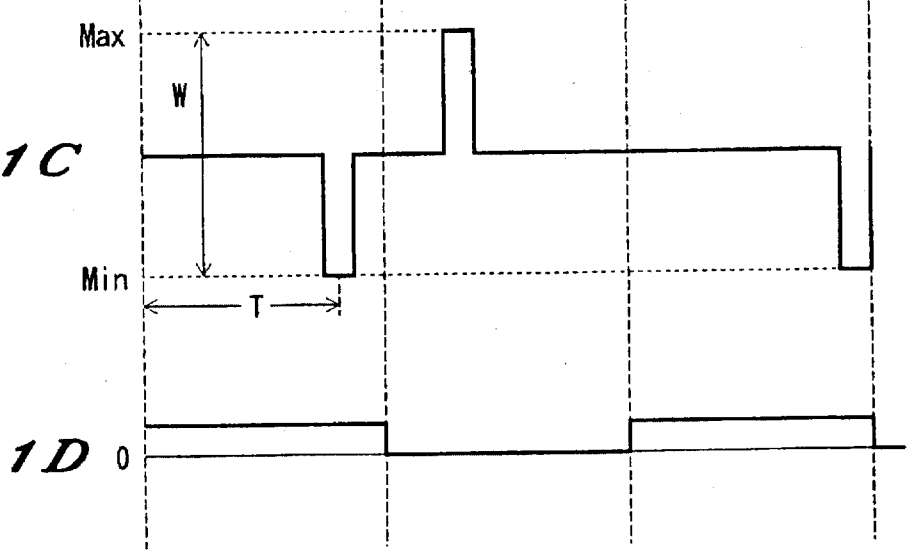
FIG. 1C
FIG. 1D

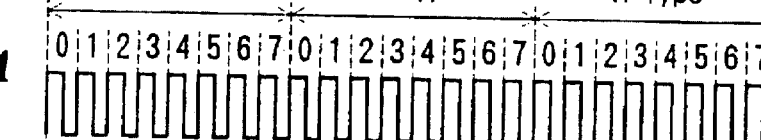
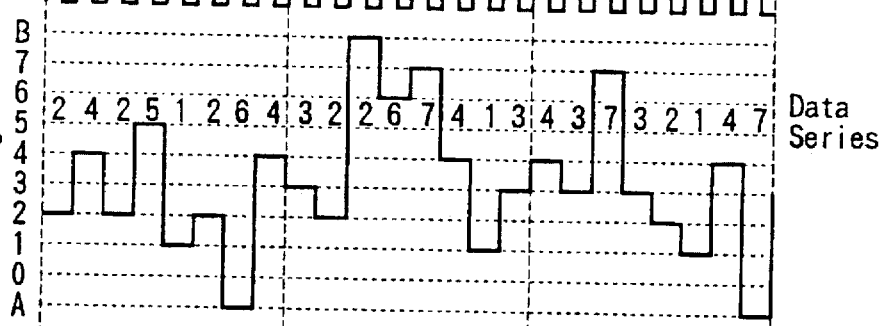
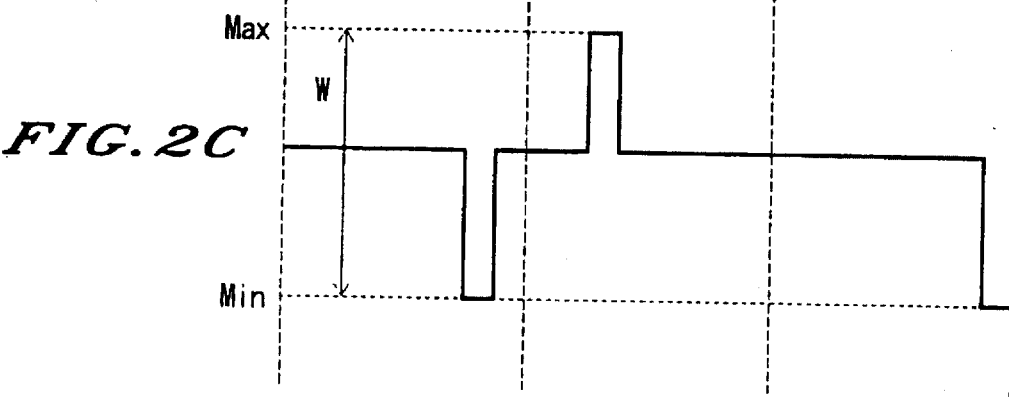

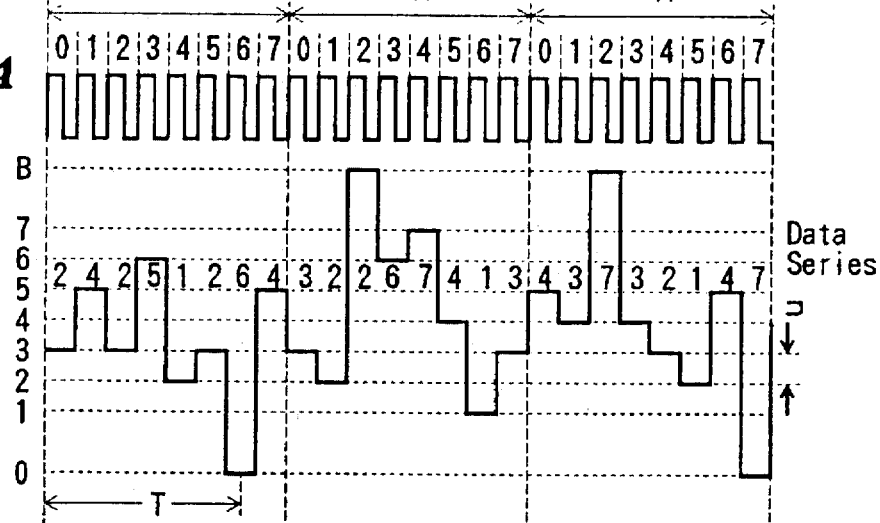

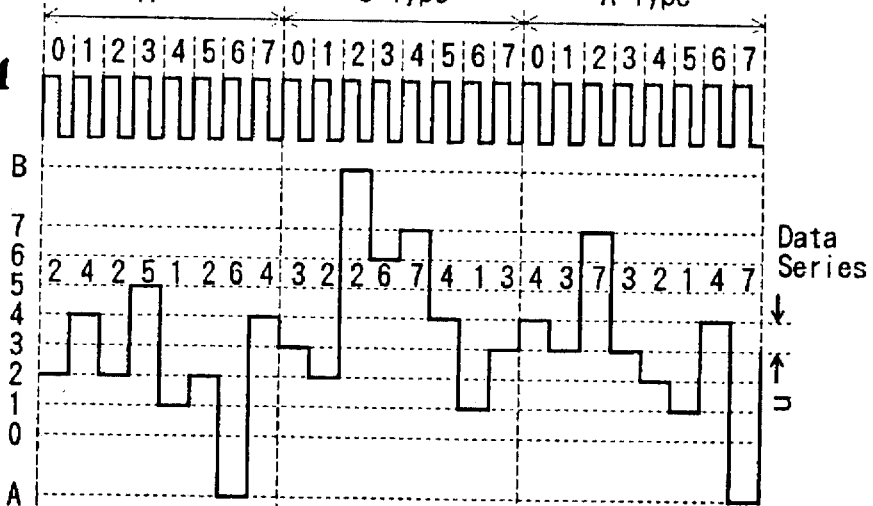
FIG. 6A
FIG. 6B
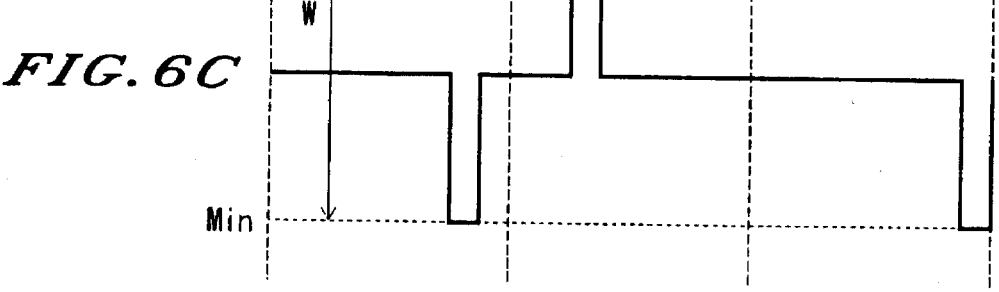
FIG. 6C

1

MUTUAL CONVERSION METHOD OF BINARY DATA AND MULTILEVEL SIGNAL, ITS COMMUNICATION METHOD, AND ITS RECEIVING DEVICE

BACK GROUND OF THE INVENTION

1. Field of the Invention

The present invention relates to a method of converting binary data and a multilevel signal, mutually and a communication method employing the mutual conversion. Further, it relates to a receiving device to stabilize amplitude and sampling timing of a received signal.

2. Description of the Prior Art

It has been known for data transmission to modulate a carrier with a predetermined frequency by binary data in amplitude, frequency and phase modulation. However, they are problematic in transmission efficiency. Alternatively, there has been a modulation method to use a multilevel signal converted in three to four bites per unit from binary data. This method increases state number of the carrier and improves the transmission efficiency. However, this method also has following several problems.

When the transmission method is the amplitude modulation by the multilevel signal, it is necessary to quantize a demodulated multilevel signal at multilevels at receiving end. Accordingly, accurate detection of amplitude width and sampling standard from the received multilevel signal are required for accurate inverse conversion from the multilevel signal to the binary data. Since the amplitude width of the received multilevel signal is affected with attenuation of a transmission line, temperature characteristics of an amplifier, aging variation, and so on, an automatic gain control (AGC) is necessary to stabilize the amplitude width. However, it has been difficult to obtain an accurate control voltage stably and constantly when the multilevel random signal is used as a modulation signal. Further, there has been a problem that the timing standard cannot be picked up at the receiving end, because a constant amplitude width continues when same data are successively output.

SUMMARY OF THE INVENTION

Therefore, it is an object of the present invention to obtain level and timing standards accurately from a received signal in mutual conversion between binary data and a multilevel signal.

It is another object of the present invention to stabilize levels of the received multilevel signal so as to obtain accurate standard levels from the received signal at the time of demodulation.

It is further object of the present invention to provide accurate and stabilized sampling timing of the received multilevel signal.

According to the first aspect of the invention, there is provided a conversion method of binary data into a multilevel signal. The binary data is constituted by n bits per data. The multilevel signal has m ($m=2^n$) time slots per period, or symbol periods per period, and m+1 levels. The time slots range from the 0th to m−1th, and the levels range from the 0th to the m−1th and an upper standard level above the m−1th. Further, consecutive basic periods are defined as A type or B type basic period, alternately.

In the respective A type basic periods, data values are shifted up by one level so as to generate the multilevel signal, and in the respective B type basic periods, data values are not shifted at all.

The binary data has m data per basic group. One of the m data appearing at kth from the beginning of the basic group is defined as an index data. The value of the index data is defined as a time index value T when the binary data is converted into the multilevel signal. The other data, or m−1 data, is defined as normal data j whose level values are defined as $L_j$.

In order to gain amplitude and timing standards at the time of signal receiving, the index data locating at kth position in the basic group is arranged to take the 0th level in the Tth time slot of the basic period when the basic period is the A type and to take the upper standard level in the Tth time slot of the basic period when the basic period is the B type. The normal data j is allocated to each of the corresponding time slots except the Tth time slot, taking $L_j+1$ levels being shifted up by one level when the basic period is the A type, and taking $L_j$ levels without being shifted when the basic period is the B type.

According to the second aspect of the invention, there is provided another conversion method of the binary data into the multilevel signal. The multilevel signal is constituted by m+1 levels including 0th to m−1th levels and a lower standard level below the 0th level. The difference between the first and the second aspects of the invention is where to set the standard level, above the m−1th level or below the 0th level. Therefore, the index data locating in the kth position of the basic group is arranged to take the m−1th level in the Tth time slot when the basic period is the A type and to take the lower standard level in the Tth time slot when the basic period is the B type. Further, the normal data j takes $L_j-1$ level being shifted down by one level when the basic period is the A type, and takes $L_j$ level without being shifted when the basic period is the B type.

According to the third aspect of the invention, there is provided an inverse conversion method, converting the multilevel signal into binary data. Corresponding relation of the ranges between the binary data and the multilevel signal are the same as that described in the first aspect of the invention. The method further includes the steps of:

detecting a minimum value of the multilevel signal in the A type basic periods and detecting a maximum value of the multilevel signal in the B type basic periods;

generating m+1 standard levels based on a difference between the minimum value and the maximum value so as to quantize the multilevel signal;

deciding each level value $L_j$ of the multilevel signal in respective the time slot based on the m+1 standard levels;

detecting a time slot number T of the minimum value in the basic period when the basic period is the A type basic period and detecting a time slot number T of the maximum value when the basic period is the B type;

defining the time slot number T as a value of the index data;

locating the index data at kth position from the beginning of a group; and converting the respective level value $L_j$ of the multilevel signal except the Tth time slot in the basic period into the respective binary data which is located at respective position of the group corresponding to the respective time slot, the binary data having value $L_j-1$ given by shifting down the level value $L_j$ of the multilevel signal by one level when the basic period is the A type period and having value $L_j$ without shifting when the basic period is the B type period.

According to the fourth aspect of the invention, there is provided another inverse conversion method. The multilevel signal is constituted by m+1 levels including 0th to m−1th levels and a lower standard level below the 0th level. The difference between the third and the fourth aspects of the invention is which multilevel signal is used for the inverse conversion, the multilevel signal with the upper standard level above the m−1th level or that with the lower standard level below the 0th level. The inverse conversion method further includes the steps of:

detecting a maximum value of the multilevel signal in the A type basic period and detecting a minimum value of the multilevel signal in the B type basic period;

generating m+1 standard levels based on a difference between the minimum value and the maximum value so as to quantize the multilevel signal;

deciding each level value $L_j$ of the multilevel signal in the respective time slot based on the m+1 standard levels;

detecting a time slot number T of the maximum value when the basic period is the A type and detecting a time slot number T of the minimum value when the basic period is the B type;

defining the time slot number T as a value of the index data;

locating the index data at kth position from beginning of a group; and converting the respective level value $L_j$ of the multilevel signal except the Tth time slot in the basic period into the respective binary data which is located at respective position of the group corresponding to the respective time slot, the binary data having value $L_j+1$ given by shifting up the level value $L_j$ of the multilevel signal by one level when the basic period is the A type and having value $L_j$ without shifting when the basic period is the B type.

According to the fifth aspect of the invention, there is provided the other conversion method of binary data into the multilevel signal. Two levels, an upper standard level above the m−1th level and a lower standard level below the 0th level, are added to the m levels of the multilevel signal. Namely, the multilevel signal has m+2 levels. Therefore, the index data is defined as the multilevel signal taking the lower standard level in the respective A type basic periods and the upper standard level in the respective B type basic periods. The respective normal data j is allocated into each time slot except for the Tth time slot taking the multilevel signal of respective $L_j$ level without being shifted.

According to the sixth aspect of the invention, there is provided the other inverse conversion method of the multilevel signal into binary data. The inverse conversion method includes the steps of:

detecting a minimum value of the multilevel signal in the A type basic period and detecting a maximum value of the multilevel signal in the B type basic period;

generating m+2 standard levels based on a difference between the minimum value and the maximum value so as to quantize the multilevel signal;

calculating each level value of the multilevel signals based on the m+2 standard levels;

detecting a time slot number T of the minimum value when the basic period is the A type and detecting a time slot number T of the maximum value when the basic period is the B type;

defining the time slot number T as a value of the index data;

locating the index data at kth position from beginning of a group; and converting the respective level value $L_j$ of the multilevel signal except the Tth time slot in the basic period into the respective binary data which is located at respective position of the group corresponding to the respective time slot, the binary data having value $L_j$ without shifting.

According to the seventh aspect of the invention, there is provided a receiving device utilized in a communication method transmitting the multilevel signal converted by the conversion method described in the first, second, and fifth aspects of the invention. The receiving device is constituted by:

an amplifier so as to receive the multilevel signal transmitted through the transmission line;

a maximum/minimum value detection means of the first and the fifth aspects detecting a minimum voltage value of the multilevel signal in the A type basic period and a maximum voltage value of the multilevel signal in the B type basic period, or a maximum/minimum value detection means of the second aspect detecting a maximum voltage value of the multilevel signal in the A type basic period and a minimum voltage value of the multilevel signal in the B type basic period; and an amplification factor controller so as to retain a constant voltage difference between the minimum voltage value and the maximum voltage value.

According to the eighth aspect of the invention, there is provided another receiving device utilized in a communication method transmitting the multilevel signal converted by the conversion method described in the first, second, and fifth aspects of the invention. The receiving device is constituted by:

a synchronizing index signal detection means of the first and the fifth aspects detecting a synchronizing index signal at the timing when the multilevel signal takes a minimum voltage value in the A type basic period, and at the timing when the multilevel signal takes a maximum voltage value in the B type basic period, or a synchronizing index signal detection means of the second aspect detecting a synchronizing index signal at the timing when the multilevel signal takes a maximum voltage value in the A type basic period, and at the timing when the multilevel signal takes a minimum voltage value in the B type basic period;

a synchronizing signal generating means generating a synchronizing signal so as to provide a sampling timing of the multilevel signal in respective the time slots by phase-locking the synchronizing signal to the synchronizing index signal; and a sampling means sampling said multilevel signal based on the sampling timing provided by the synchronizing signal.

The values of the above described 0, 1 . . . , m−1 of the 0th, first . . . , m−1th levels are mere index number labeled thereon and so are the value of the level value $L_j$. Namely, absolute voltage values corresponding to the lower and upper standard levels and the 0th to m−1th levels are not necessary to have regular intervals each other. As an example, it is acceptable to set irregular voltage intervals only between the lower standard and the 0th levels, and the upper standard and the m−1th levels such as 2, 3/2, folds and so on in contrast to setting a regular interval of each voltage from the 0th to m−1th levels. Since absolute voltage values of the lower and upper standard levels are utilized to generate absolute standard voltage values corresponding to each level, the irregular voltage levels help distinguish the standard levels from the levels of other normal data so as to detect timing of time slots detection and to quantize voltage values of the multilevel signal, accurately.

Therefore, shifting level values up and down by one level means merely shifting up and down by one index regardless of intervals among levels. When level values are shifted up and down by one level, they are respectively described as $L_j+1$ and $L_j+1$ which do not mean absolute voltage values but means mere index value.

The conversion methods described in the first, second, and fifth aspects of the invention are designed to ensure detecting the standard for sampling and amplitude without impeding transmission efficiency. For that purpose, a predetermined data, or the index data, is manipulated to contain two pieces of information as the data and the standard for sampling and amplitude. The information as the data is conveyed by a time slot number and the information as the standard for sampling and amplitude is by the level of the index data. The value T of the index data of the multilevel signal, is converted as the multilevel signal in the Tth time slot taking the 0th or upper standard level in the first aspect of the invention, the m−1th or lower standard level in the second aspect, and the lower or upper standard level in the fifth aspect. In the A type basic period, the value $L_j$ of the normal data j except the index data are shifted up by one level in the first aspect and described as $L_j+1$, or shifted down by one level in the second aspect and described as $L_j-1$. In the B type basic periods of the first and second aspects, the value $L_j$ of the normal data j become the level value in the respective time slot of the multilevel signal without being shifted. In the fifth aspect of the invention, level shift is not carried out. The A and B type basic periods appear in consecutive basic periods, alternately. The binary data constituted by n bits per data and m data per group is converted into the multilevel signal of m time slots per basic period with m+1 levels in the first and second aspects and m+2 levels in the fifth aspect. Consequently, the transmission efficiency of this invention becomes as same as that of conventional multilevel transmission method of m data ensuring detecting the standard for sampling and amplitude.

In other words, a conventional conversion method of m data may obtain the standard for sampling and amplitude of the multilevel signal by arranging one additional time slot to show the beginning of a data group. However, this arrangement impedes transmission efficiency by the additional time slot without any information as data. In this point of view, conversion method of the present invention has improved transmission efficiency than that of the prior art.

The inverse conversion methods described in the third, fourth, and sixth aspects of the invention are designed to convert the multilevel signal into binary data, accurately. In the alternately appearing A and B type basic periods, detecting the maximum or minimum level value of the multilevel signal per period helps determine maximum amplitude of the multilevel signal and generate standard levels so as to quantize the multilevel signal, accurately. In addition, information where the index signal locates among the m time slots per basic period helps provide the value of the original index data regardless of levels which the index signal are taking.

Further, in the case where several normal data whose values are the same to each other continuously appears in a basic period, the index data which definitely appears in one basic period enables the receiving end to pick up a timing standard periodically and to regenerate carrier wave easily at the time of synchronous demodulation.

As described above, the present invention can transmit amplitude information as the detection standard of multilevels and timing information without redundant data so that accurate inverse conversion of the multilevel signal into binary data can be achieved without impeding transmission efficiency.

In the communication method employing the first aspect of the invention, the multilevel signal regardless of original binary data definitely have the time slot taking the 0th level in the respective A type basic period and the time slot taking the upper standard level in the respective B type basic period. Consequently, the minimum voltage value detected in the A type basic period means the 0th level, and the maximum voltage value detected in the B type basic period means the upper standard level.

In the communication method employing the second aspect of the invention, the multilevel signal regardless of original binary data definitely have the time slot taking the m−1th level in the A type basic period and the time slot taking the lower standard level in the B type basic period. Consequently, the maximum voltage value detected in the A type basic period means the m−1th level, and the minimum voltage value detected in the B type basic period means the lower standard level.

In the communication method employing the fifth aspect of the invention, the multilevel signal regardless of original binary data definitely have the time slot taking the lower standard level in the A type basic period and the time slot taking the upper standard level in the B type basic period. Consequently, the minimum voltage value detected in the A type basic period means the lower standard level, and the maximum voltage value detected in the B type basic period means the upper standard level.

Therefore, controlling gains of the amplifier so as to obtain the constant voltage difference between the maximum and minimum voltage values stabilizes voltage corresponding to the level values of the multilevel signal output by the amplifier. Such stabilized voltage further helps stabilize the standard voltage for quantizing the multilevel signal. Consequently, precision of the conversion into binary data improves.

Further, the synchronizing index signal employed in the first and the fifth aspects is output at the same timing when the minimum voltage in the A type basic period and the maximum voltage in the B type basic period appear. And the synchronizing index signal employed in the second aspect is output at the same timing when the maximum voltage in the A type basic period and the minimum voltage in the B type basic period appear.

Further, the synchronizing signal is generated in synchronize with the synchronizing index signal so as to provide timing of sampling the multilevel signal in each time slot. Then, the multilevel signal is sampled based on the timing by the synchronizing signal.

In the above-described three communication methods, timing information to generate the synchronizing index signal is definitely contained in a certain time slot of each basic period of the multilevel signal. That enables to lock phase corresponding to the synchronizing signal of each basic period and to generate the synchronizing signal stabilized by locking phases of the multilevel signal. Consequently, precision of inverse conversion of the multilevel signal into binary data can be improved.

BRIEF DESCRIPTION OF THE DRAWING

In the accompanying drawings:

FIGS. 1A–1D are timing charts explaining conversion method in the first embodiment;

FIGS. 2A–2C are timing charts explaining conversion method in the second embodiment;

FIGS. 5A–5D are timing charts explaining a conversion method as a variation that is described in the first embodiment;

FIG. 6 is a timing chart explaining a conversion method as a variation that is described in the second embodiment;

DETAILED DESCRIPTION OF THE PREFERRED EMBODIMENT

The invention will be more fully understood by reference to the following examples.

EXAMPLE 1

Figure 10:
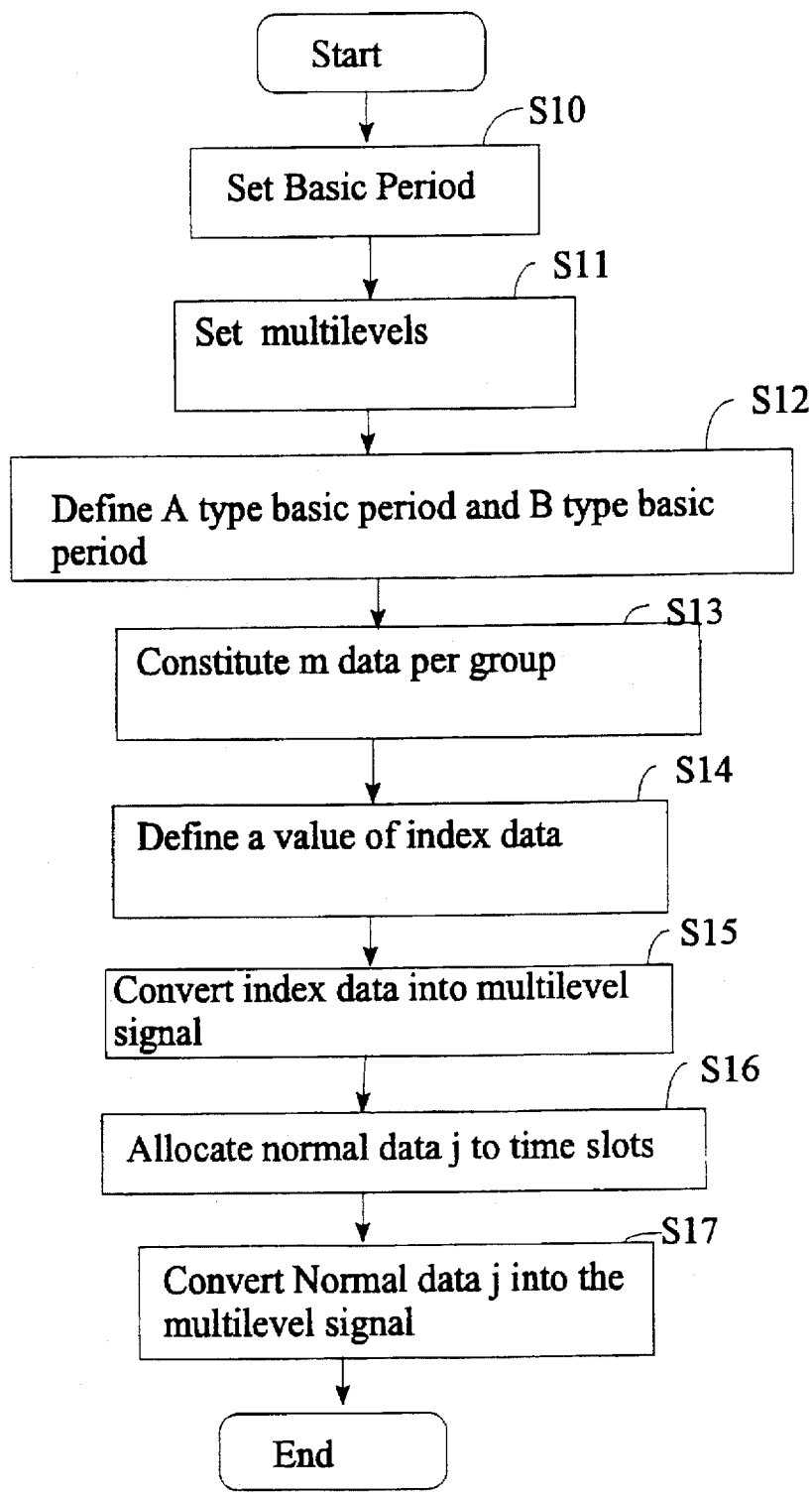
FIG. 10 is a flowchart of a conversion method according to the present invention.

With reference to FIGS. 1A–1D and steps S10–S17 of FIG. 10, a conversion method of the present invention is explained.

The conversion method in this embodiment employs 3 bits per data, 8 as the value of m, 9 levels as m+1 levels, an upper standard level B at the top as the mth level above the m−1th level, 8 time slots, 8 data per group, and 1 as the value of k meaning that an index data appears first in the group.

In concrete, when data series of the first, second, and third groups are described in binary, they will be 110, 010, 100, 010, 101, 001, 010, and 100; 010, 011, 010, 110, 111, 100, 001, and 011; and 111, 100, 011, 111, 011, 010, 001, and 100, respectively. When the data series of the first, second, and third groups are described in eight digit 0'x', they will be 0'62425124', 0'23267413', and 0'74373214', respectively. An index data is shown at the beginning of each of those three groups. Namely, the index data will be 0'6' in the first group, 0'2' in the second, and 0'7' n the third.

Data Conversion in the First Group

The binary data in the first group are converted into multilevel signal in the first basic period. Since the index data of the first group is 0'6', the value 6 is regarded as a time index value T. In the Tth time slot, or the sixth in this case, the time index value 6 is decided to be a signal with 0th level. Then, other binary data of the second to eighth in the first group become normal data j. Each of them are allocated to the 0th to the seventh time slots in order except the sixth. In concrete, the second data is allocated to the 0th time slot, the third data to the first, the seventh data to the fifth, and the eighth to the seventh.

Then, the normal data j from the second to the eighth are converted into the multilevel signal. The level values $L_j$ are 2, 4, 2, 5, 1, 2, and 4. Since the first basic period is an A type basic period, the level values $L_j$ are shifted up by one level in the first basic period. Namely, each of the level values $L_j$ becomes 3, 5, 3, 6, 2, 3, and 5 on surface.

In synchronization with a synchronizing signal shown by FIG. 1A, the signal level of the multilevel signal including the index data are decided as 3, 5, 3, 6, 2, 3, 0, and 5 in the 0th to the seventh time slots of the first basic period, respectively.

Data Conversion in the Second Group

A conversion of binary data in the second group into a multilevel signal is explained here. The converted signal from binary data of the second group is placed in the second basic period. Since the index data of the second group is 0'2', the value 2 is regarded as a time index value T. In the Tth time slot, or the second in this case, the time index value 2 is converted to an upper standard level B signal (or the mth level, the eighth level in this case). Other binary data from the second to eighth of the second group becomes normal data j. Each of them are allocated to the 0th to the seventh time slots in order except the second. In this case, the second data is allocated to the 0th time slot, the third data to the first, the fourth data to the third, the fifth data to the fourth . . . the eighth data to the seventh.

Then, the normal data j from the second to the eighth are converted from binary into the multilevel signal. The level values $L_j$ become 3, 2, 6, 7, 4, 1, and 3 in concrete. Since this second basic period is a B type basic period, the level values $L_j$ are not shifted at all here.

In synchronization with a synchronizing signal shown by in FIG. 1A, the levels of the multilevel signal, including the index data, are decided as 3, 2, B, 6, 7, 4, 1, and 3 in the 0th to seventh time slots of the second basic period, respectively.

Data Conversion in the Third Group

Then, the binary data of the third group is converted in a multilevel signal in the third basic period. This period is an A type basic period which is as same as the first basic period. So, the level value $L_j$ of normal data j are shifted up by one level when they are converted into the multilevel signal. Namely, the level value $L_j$ of the normal data is shifted up by one level only in the A type basic period as shown by FIG. 1D.

As described above, each of the group of data is converted into the multilevel signal in each basic period. Here, the conversion unit is 8 figure data each of which is constituted in three bits. In the transmission line, the multilevel signal is transmitted at nine levels from −4V to 4V at 1V interval.

Further, level shift of data is relative. Namely, shifting up by 0.5V in the A type basic period and shifting down by 0.5V in the B type basic period is equal to shifting up by 1V only in the A type basic period.

After the multilevel signal is input into a low-pass filter, its output signal modulates carrier in amplitude, frequency, or phase modulation and the modulated signal is transmitted to a transmission line. The modulated signal which is received through the transmission line is demodulated to pick up the multilevel signal.

Inverse Conversion

Figure 11:
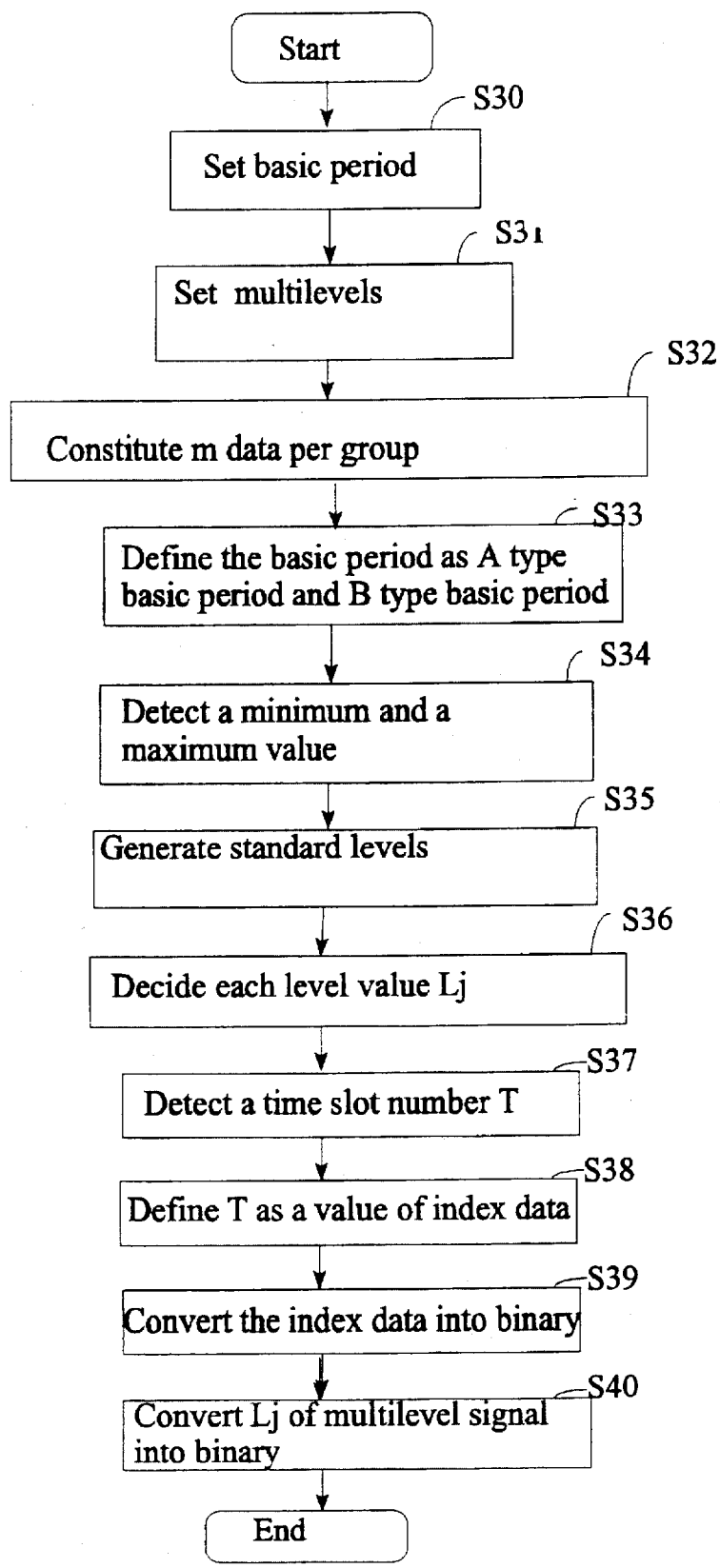
FIG. 11 is a flowchart of an inverse conversion method according to the present invention.

An inverse conversion converting the multilevel signal into binary data is explained here, and in correspondence with steps S30–S40 of FIG. 11.

First, each signal voltage of the eight time slots in a basic period is sampled and converted into digital data in synchronize with a synchronize signal. They are temporarily stored in a buffer memory. When the basic period is the A type, the minimum voltage among the eight data in the period becomes the 0th level voltage value. When the basic period is B type, the maximum voltage among the eight data in the period will be decided as the eighth level voltage value. These voltage values are stored till demodulation of signals in the next basic period finishes.

Then, as shown in FIG. 1C, a voltage width W is obtained based on a maximum voltage value in a previous period, i.e., the upper standard level B and a minimum voltage value in a current basic period, i.e., the 0th level. Alternatively, it is obtined based on the minimum voltage value in the previous period and the maximum voltage value in the current period. When there is no intrusion of noise or instantaneous fluctuation of signal level in a transmission line, the maximum voltage value becomes +4V and the minimum −4V. Namely, the voltage width W becomes 8V. Then, a voltage difference between each level is calculated by the expression d=W/8 using the value of the voltage width W. Thereby, voltage values of nine levels from the 0th to eighth are decided at the receiving node.

With the respective voltage values, voltage values of each signal in a basic period are quantized at 9 levels from 0th to the eighth. For example in FIG. 1B, the level values of the multilevel signal in the first basic period become data series of 3, 5, 3, 6, 2, 3, 0, and 5.

When the basic period is A type, time slot number T of data whose level value is 0 is calculated. Since the level value 0 in the first basic period locates in the sixth time slot, the slot number T becomes 6. The value 6 becomes a demodulated value of the index data. Then, the level value 0 is erased from the data series and that of the rest of seven data is shifted down by one level. Namely, the rest of the seven data becomes 2, 4, 2, 5, 1, 2, and 4. Since the index data should locates at the k-th position of a data group, i.e., the first position in this case, data 6 should be positioned ahead of the rest of the seven data. Thus, a group of demodulated data series which is shown by 0'62425124' is obtained. Like this, the multilevel signal in the A type basic period is converted into original binary data.

A multilevel signal in the second basic period is processed as same as in the first basic period except for one. Since the second basic period is B type, a maximum voltage value is detected as a voltage value which corresponds to an upper standard level B, or the eighth level. Level values in the second basic period become 3, 2, B, 6, 7, 4, 1, and 3 by the same quantizing process described in the first basic period. In this B type basic period, level values are not shifted at all. Then, time slot number T in which the level value is equal to the upper standard level B after quantization is calculated. This value T becomes the demodulated index data in the B type basic period. In the second group data, the value T is 2. Then, the index data 2 and the rest of seven normal data j are lined in one. In result, there is obtained a group of modulated data series which is shown by 0'23267413'. Like this, the multilevel signal in the B type basic period is demodulated into original binary data.

Similarly, the multilevel signal in following period is also demodulated into original binary.

Level shift is relative as described in the conversion. If the level shift of data is considered by absolute voltage level in inverse conversion, shifting down voltage values of the multilevel signal by one level in the A type basic period without shifting down in the B type period is equivalent to shifting down by 0.5V in the A type basic period and shifting up by 0.5V in the B type basic period.

Figure 3A:
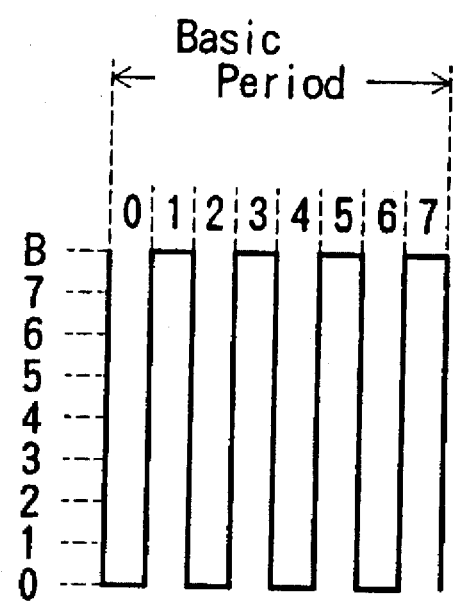
FIGS. 3A and 3B are wave form charts showing a pattern of a multilevel signal which indicates the beginning or end of data frame in the first embodiment.
Figure 3B:
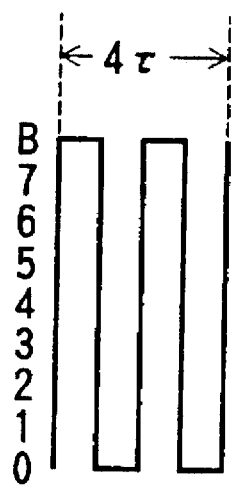
Figure 4A:
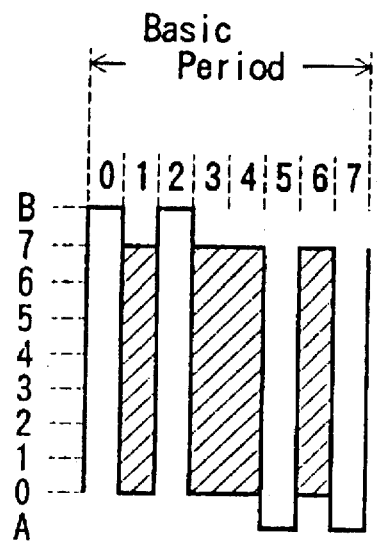
FIGS. 4A to 4F are wave form charts showing a pattern of a multilevel signal which indicates the beginning or end of data frame in the second embodiment.
Figure 4B:
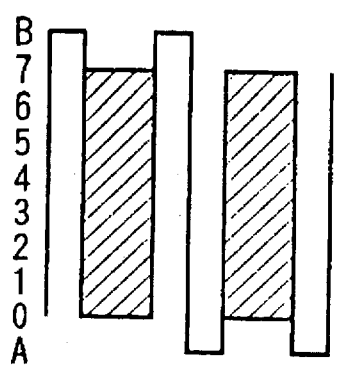
Figure 4C:
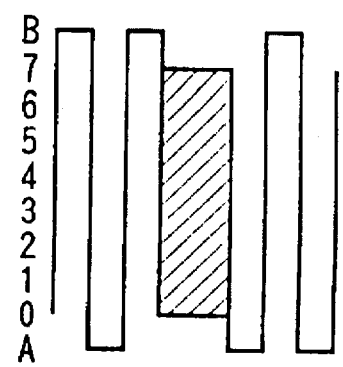
Figure 4D:
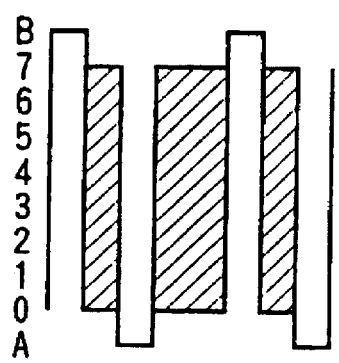
Figure 4E:
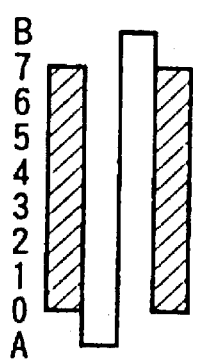
Figure 4F:
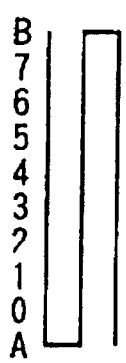

In this example, the A and B type basic periods are arranged to appear alternately. Thus, a detection of the data frame head enables to decide the type of basic period sequentially like first A type and then B type. When data is not transmitted, outputting maximum and minimum voltages alternately and fixing amplitude of the multilevel signal helps decide quantized levels at inverse conversion. Alternatively, as shown in FIGS. 3A and 3B, outputting identified signals to show maximum level at least in two time slots and minimum level at least in two time slots in a period helps detect the data frame head, because such data does not appear without intention.

Although generating the synchronizing signal is necessary so as to detect time slot, the multilevel signal of the index data can substitute it. The multilevel signal of the index data definitely exists in each basic period as a minimum level signal in the A type basic period and as a maximum level in the B type period. Further, constituting a phase locked loop (PLL) with the multilevel signal of the index data helps reproduce an accurate clock signal, constantly.

Receiving Device

Figure 7:
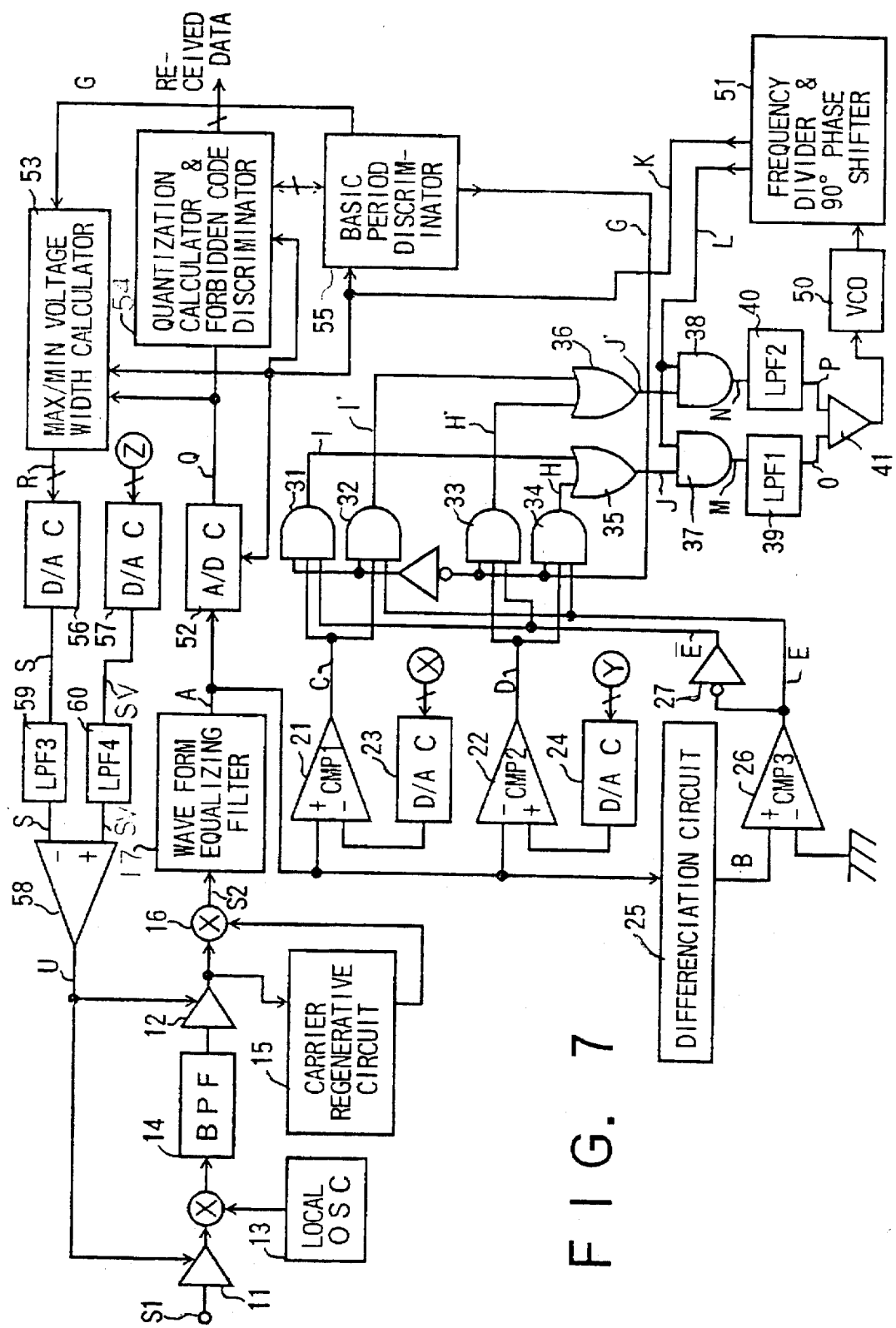
FIG. 7 is a block diagram showing a constitution of the receiving device that is described in the first and second embodiments.

FIG. 7 is a block diagram showing the constitution of a receiving device employed in this embodiment. The following paragraphs describes how amplification factor of multilevel signal S1 which is received by gain variable amplifiers 11 and 12 is controlled. After the multilevel signal S1 is amplified by the amplifier 11, it is mixed with a signal from a local oscillator 13 and converted in frequency into a multilevel signal S1 with intermediate-frequency. Then, a band-pass filter 14 selects the signal with predetermined intermediate-frequency and the amplifier 12 amplifies it. A carrier regenerative circuit 15 picks up a carrier from the multilevel signal S1 and input it into a synchronizing demodulator 16 which demodulates the signal S1 to obtain a multilevel signal S2. The demodulated multilevel signal S2 is input into a wave form equalizing filter 17 to form a signal as shown in the waveform of FIG. 8A.

Figure 8:
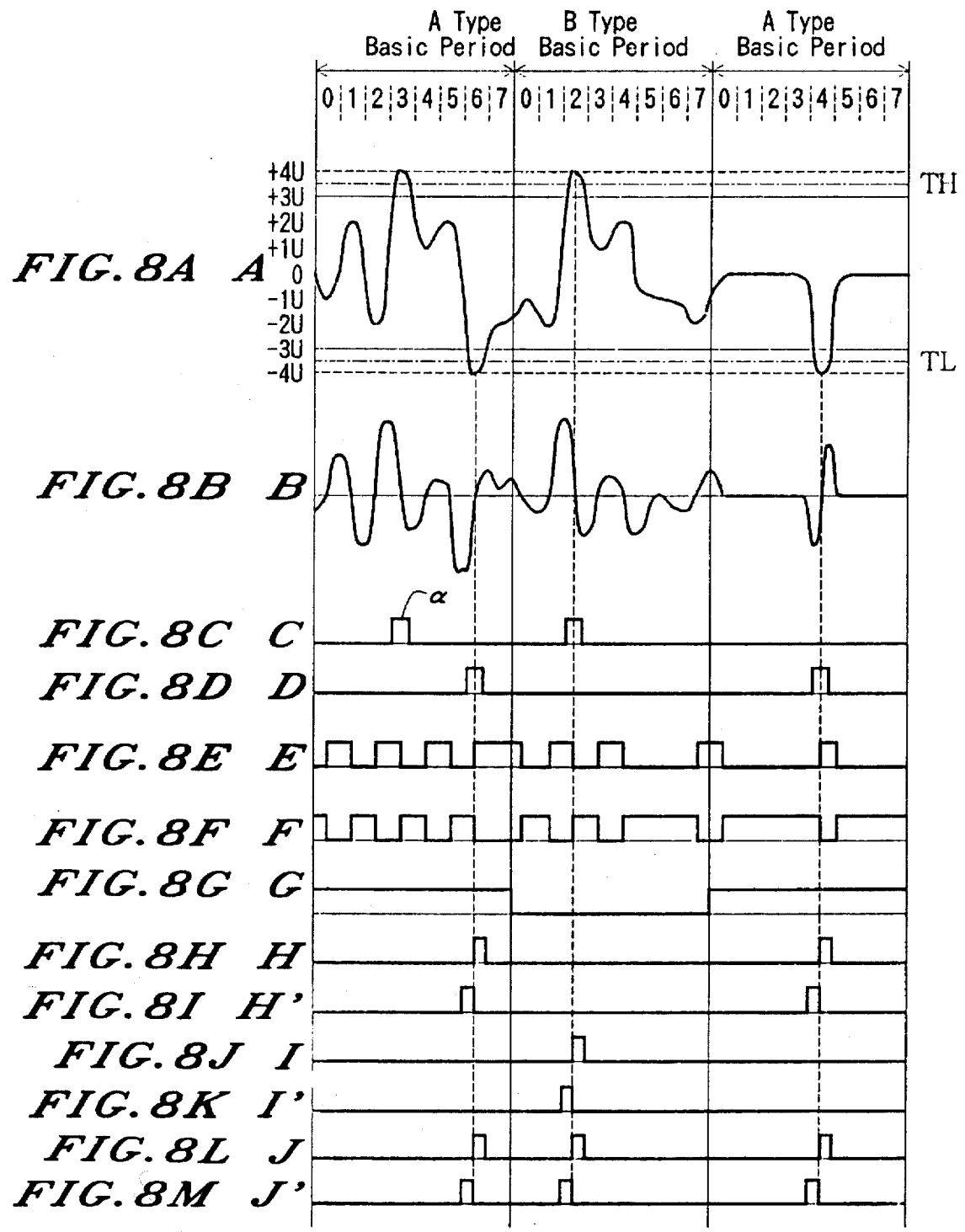
FIGS. 8A–8M and 9A–9F are timing charts explaining performance of the receiving device that is described in the first and second embodiments.

The signal A is input both into a non-inversion input terminal of a comparator 21 and into an inversion terminal of a comparator 22. A high threshold voltage TH shown in FIG. 8A is input into an inversion input terminal of the comparator 21 through a D/A convertor 23. A low threshold voltage TL shown in FIG. 8A is input into a non-inversion input terminal of the comparator 22 through a D/A convertor 24. The high and low threshold voltages TH and TL can be altered by an instruction value. Consequently, the comparator 21 outputs a signal C (FIG. 8C) as shown in FIGS. 7 and 8, and the comparator 22 outputs signal 8D as shown in FIGS. 7 and 8. The high and low threshold voltages TH and TL are set to pick up signals of the 0th level and the upper standard level B, respectively. Therefore, the signal C shows high level in a slot where the signal A (FIG. 8A) reaches the high threshold voltage TH, and the signal D shows high level in a slot where the signal A reaches the low threshold voltage TL.

The signal A is differentiated by a differentiation circuit 25 resulting in obtaining the signal B as shown in FIGS. 7 and 8B. The signal B (FIG. 8B) is input into a non-inversion input terminal of a comparator 26 whose inversion input terminal is earthed. The comparator 26 outputs a signal E as shown in FIGS. 7 and 8E which shows high level when the signal A is rising. An inverter 27 generates an inversion signal E*.

The signal C is input both into AND gates 31 and 32, and the signal D is into AND gates 33 and 34. The signal E is input both into AND gates 32 and 34, and the signal E* is into AND gates 31 and 33. A period discrimination signal G (FIG. 8G) is input both into the AND gates 33 and 34, and its inversion signal G* is into the AND gates 31 and 32. As a result, a signal I (FIG. 8J) is output from the AND gate and a signal H (FIG. 8H) is from the AND gate 34. Namely, the Signal H shows high level during the latter half period when signal A reaches lower than the low threshold voltage TL in the A type basic period. And the signal I shows high level during the latter half period when the signal A reaches higher than the high threshold voltage TH in the B type basic period. These signals H and I identify the time Slots of the index data in each period.

A signal H' (FIG. 8I), which is output from the AND gate 33, show high level during the first half period when the signal A reaches lower than-the low threshold voltage TL in the A type basic period. A signal I' (FIG. 8K) shows high level during the first half period when the signal A reaches higher than the high threshold voltage TH in the B type basic period. These signals H' and I' identify the time slots of the index data in each period. Alternatively, a signal α in FIG. 8C can be used as information for timing detection.

The signals I and H are input into an OR gate 35. A signal J (FIG. 8L) is output from the OR gate 35 and input into an AND gate 37. The signals I' and H' are input into an OR gate 36. A signal J' (FIG. 8M) is output from the OR gate 35 and input into an AND gate 38. Namely, the signal J shows the latter half time slots of the index data in both of the A and B type basic periods, and the signal J' shows the first half.

Figure 9:
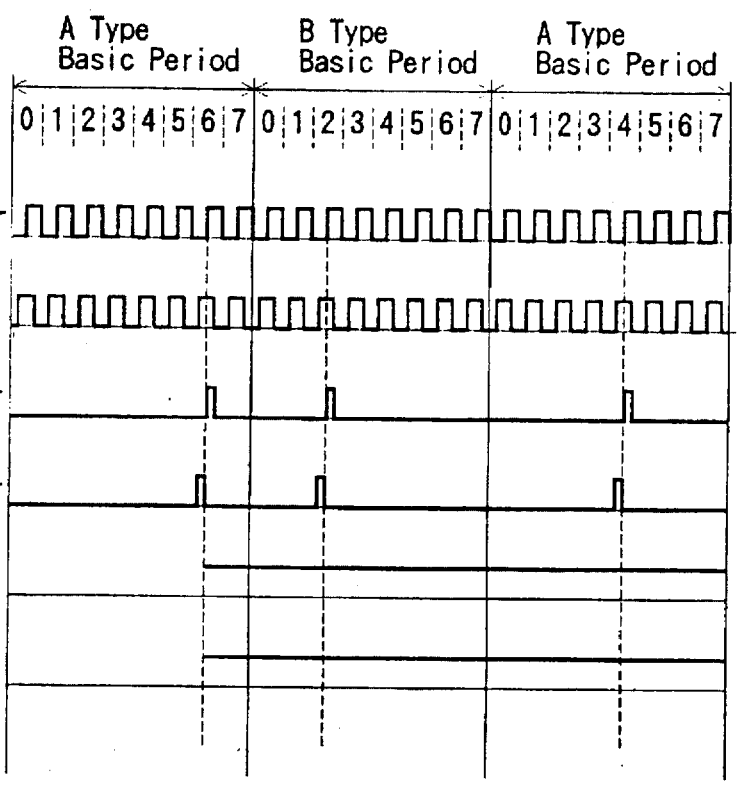

These signals J and J', together with a signal L (FIG. 9B) which is output by a frequency divider & 90 degree phase shifter 51, are input both into the AND gates 37 and 38. As shown in FIGS. 7 and 9A–9B, the frequency divider & 90 degree phase shifter 51 outputs the signals K (FIG. 9A) and L of square waves whose one period is equal to one time slot of the multilevel signal. The signal L leads the signal K in phase by 90 degree. Therefore, a signal M (FIG. 9C) output by the AND gate 37 exhibits high level during the periods in which-the high levels of the signals J and L are overlapped. A signal N (FIG. 9D) output by the AND gate 38 exhibits high level during the period in which the high levels of the signals J' and L are overlapped.

Signals O and P are wave forms after the signals M and N are integrated and smoothed. Namely, the levels of the signals O (FIG. 9E) and P (FIG. 9F) are in direct proportion to pulse widths of the signals M and N. Therefore, an output signal from a differential amplifier 41 exhibits a level difference between the signals O and P, and the level difference is input into a voltage control oscillator 50. The phases of the output signals K and L vary depending on a voltage value of an input signal of the voltage control oscillator 50. This closed loop is forming a phase locked loop. Namely, the phase of the signals L and K are decided so as to equalize pulse widths of the signals M and N. Thus, the high level period of the signal L exists in the middle of a time slot and each rise of the signal K which is lagged behind the signal L in phase by 90 degree exists in the middle of each time slot.

That is to say that sampling the signal A by an A/D convertor 52 in synchronization with each rise of the signal K enables to obtain a level value of a multilevel signal in each time slot. Both of an output data Q from the A/D convertor 52 and the period discrimination signal G are input into a max/min voltage width calculator 53. Both a minimum value of the data Q in the A type period, or a minimum voltage value of the multilevel signal, and a maximum value of the data Q in the B type period, or a maximum voltage value of the multilevel signal are detected thereby. A voltage difference data R is input into a D/A convertor 56 and a max/min voltage difference signal S is input into an inversion input terminal of a differential amplifier 58 through a low-pass filter 59. Further, a standard voltage T output from a D/A convertor 57 is input into a non-inversion terminal of the differential amplifier 58 through a low-pass filter 60. A voltage difference U between the voltage difference signal S and the standard voltage SV is input both into control terminals of the gain control amplifiers 11 and 12 to control their amplification factors.

Namely, the amplification factors of the amplifiers 11 and 12 are controlled with negative feedback so as to take a constant difference between the minimum voltage value in the A type basic period and the maximum voltage value in the B type basic period. Consequently, voltage values of the multilevel signal A are stabilized in each level. As stated above, the timing signal K to sample the signal A is generated from the multilevel signal A. The signal A is quantized into each level value $L_j$ by a quantization calculator & forbidden code discriminator 54.

Due to a constant amplitude of the multilevel signal A, a voltage value of each level does not fluctuate, and accurate quantization of each data and regeneration of a synchronizing signal become easy and possible.

In this embodiment, amplitude modulation is used. Alternatively, other modulation such as frequency and phase modulation can be employed and suitable demodulation method can be employed in accordance with various modulations. For example, in QAM demodulation can be performed by locking phase of carriers with 90 degree phase difference generated by a local oscillator based on demodulation signals.

EXAMPLE 2

Another conversion method is explained.

The conversion method in this embodiment employs 3 bits per data, 8 as the value of m, 10 levels as m+2 levels, a lower standard level A and an upper standard level B, 8 time slots, 8 data per group, and 1 as the value of k meaning that an index data appears first in the group.

In the first embodiment, multilevels of the index data are alternately set at the 0th and eighth as the upper standard B, in successive basic periods. When the 0th level is used as a level for an index data, levels of other normal data j are shifted up by one to avoid mistaking the normal data value 0 for the lower standard level. In contrast in the second embodiment, two extra levels, a lower standard level A and an upper standard level B, are added to the original m levels. Namely, multilevel index data are allocated alternately to the lower standard level A and the upper standard level B in successive basic periods and the multilevels of other normal data j are allocated to m multilevels as they are without being shifted up or down. Thus, level shift of multilevel is not required in the case of normal and inverse conversion in the second embodiment.

The same data series as employed in the first embodiment is employed here. Namely, the first group data is 0'62425124', the second group data is 0'23267413', and the third group is 0'74373214'. Values of the index data which appear in the head of each group are 6, 2, and 7. Therefore, the value of the sixth time slot in the first basic period is set at the lower standard level A, the value of the second time slot in the second basic period is at the upper standard level B, and the value of the seventh time slot in the third basic period is at the lower standard level A. The multilevels of normal data are respectively allocated in order in each time slot except for that of index data. In concrete, the multilevels becomes 0'2425124' in the first group, 0'3267413' in the second group, and 0'4373214' in the third group.

In such manner, multilevel of the index data is set at the lower standard level A and upper standard level B, alternately.

Then, demodulation of the multilevel signal into binary data is explained.

Demodulation is carried out in the same way as that described in the first embodiment. Namely, the minimum voltage among eight time slots in an A type basic period is decided as the voltage value of the lower standard level A, and the maximum voltage among eight time slots in a B type basic period is decided as the voltage value of the upper standard level B. These voltage values are stored till signals in the next basic periods have been demodulated.

As shown in FIG. 2C, voltage width W is calculated either by the maximum voltage value Max in the previous period and the minimum voltage value Min in the current period or Min in the previous period and Max in the current period. Voltage differences between levels are calculated with the voltage width W by the expression d=W/9. Accordingly, a receiving end decides voltage values for each of the 10 levels, such as the lower standard level A, the zero th to seventh level, and the upper standard level B.

Then, the voltage values of each signal in a basic period is quantized at ten levels with each voltage value. As a concrete example of the data in FIG. 2B, the level values of the multilevel signal in the first basic period become 2, 4, 2, 5, 1, 2, A, and 4, in the second basic period does 3, 2, B, 6, 7, 4, 1, and 3, and in the third basic period does 4, 3, 7, 2, 1, 4, and A.

Then, time slot number T of data whose level value is A or B in accordance with the type of the basic period is calculated. In this example, the slot numbers are 6, 2, and 7 in the first, second, and third groups, respectively. Since these values are multilevel values of the index data in each group, they are located at the kth position of the data series in each group or the first. Other data are allocated in order from the second time slot and thereafter. As a result, the multilevel signal is inversely converted into binary data such as 0'62425124' in the first basic period, 0'23267413' in the second basic period, and 0'74373214 in the third basic period. In this way, the original binary data is obtained.

In this example, patterns shown in FIGS. 4A to 4F are available as delimiters to show the beginning or end of the data frame since the multilevel signal has the lower reference level A and the upper reference level B. Namely, a distinction between the delimiters and the multilevel signal of data is possible by checking whether maximum levels or minimum levels appear in at least two time slots of a basic period or not.

In this example, the receiving node described in the first embodiment can be used to stabilize amplitude of the multilevel signal resulting in better precision of the multilevel signal when they are quantized.

In the first embodiment as shown in FIG. 1B, the voltage differences between any nearest two levels from the 0th to eighth levels are equally u volt. Alternatively, only the two voltage differences from the seventh to eighth and the 0th to first may be equal to 3u/2 as shown in FIG. 5B.

In the second embodiment as shown in FIG. 2B, the voltage differences between any nearest two levels from the lower standard level A to the upper standard level B are equally u volt. Alternatively, only the two voltage differences from the seventh to the upper standard level B, and the lower standard level A to the 0th may be equal to 3u/2 as shown in FIG. 6.

In the first and second embodiment, a synchronizing index signal generative means comprises the comparators 21 and 22, the AND gates 31 to 34, 37 and 38, and the OR gates 35 and 36; a synchronizing signal generative means comprises the low-pass filters 39 and 40, the amplifier 41, the voltage control oscillator 50, and the frequency divider and 90 degree phase shifter 51; and a sampling means comprises the A/D convertor 52.

What is claimed is:

1. A conversion method of binary data constituted by n bits per data into a multilevel signal comprising the steps of:

setting a basic period to have m (m=$2^n$) time slots ranging from 0 to m−1;

setting m+1 multilevels constituted by 0th to m−1th levels and an upper standard level above said m−1th level;

defining said basic period as A type basic period and B type basic period alternately in series;

constituting m data per group in accordance with said basic period;

defining a value of index data appearing kth from the beginning of said group as time index value T and defining values of m−1 normal data j except said index data as level value $L_j$;

converting said index data into said multilevel signal in Tth time slot of said basic period, said multilevel signal having 0th level when said basic period is said A type period and having said upper standard level when said basic period is said B type period;

allocating respective said normal data j to each of corresponding said time slots except one for said index data, and converting respective said normal data j into said multilevel signal in corresponding respective said time slot of said basic period, said multilevel signal having respective $L_j$+1 level shifting up said level value $L_j$ by one level when said basic period is said A type period and having respective $L_j$ level without being shifted when said basic period is said B type period.

2. A conversion method of binary data constituted by n bits per data into a multilevel signal comprising the steps of:

setting a basic period to have m (m=$2^n$) time slots ranging from 0 to m−1;

setting m+1 multilevels constituted by 0th to m−1th levels and an lower standard level below said 0th level;

defining said basic period as A type basic period and B type basic period alternately in series;

constituting m data per group in accordance with said basic period;

defining a value of index data appearing kth from the beginning of said group as time index value T and defining values of m−1 normal data j except said index data as level value $L_j$;

converting said index data into said multilevel signal in Tth time slot of said basic period, said multilevel signal having m−1th level when said basic period is said A type period and having said lower standard level when said basic period is said B type period;

allocating respective said normal data j to each of corresponding said time slots except one for said index data, and converting respective said normal data j into said multilevel signal in corresponding respective said time slot of said basic period, said multilevel signal having respective $L_j$−1 level shifting down said level value $L_j$ by one level when said basic period is said A type period and having respective $L_j$ level without being shifted when said basic period is said B type period.

3. A inverse conversion method of a multilevel signal into binary data constituted by n bits per data comprising the steps of:

setting a basic period to have m ($m=2^n$) time slots ranging from 0 to m−1;

setting m+1 multilevels constituted by 0th to m−1th levels and an upper standard level above said m−1th level;

constituting m data per group in accordance with said multilevel signal per said basic period;

defining said basic period as A type basic period and B type basic period alternately in series;

detecting a minimum value of said multilevel signal in said A type basic period and detecting a maximum value of said multilevel signal in said B type basic period;

generating m+1 standard levels based on a difference between said minimum value and said maximum value so as to quantize said multilevel signal;

deciding each level value $L_j$ of said multilevel signal in respective said time slot based on said m+1 standard levels;

detecting a time slot number T of said minimum value in said basic period when said basic period is said A type basic period and detecting a time slot number T of said maximum value in said basic period when said basic period is said B type basic period;

defining said time slot number T as a value of said index data;

converting said index data into said binary data which is located at kth position from a beginning of a group; and converting respective said level value $L_j$ of said multilevel signal except said Tth time slot in said basic period into respective said binary data which is located at respective position of said group corresponding to said respective time slot, said binary data having value $L_j−1$ given by shifting down said level value $L_j$ of said multilevel signal by one level when said basic period is said A type period and having value $L_j$ without shifting when said basic period is said B type period.

4. A inverse conversion method of a multilevel signal into binary data constituted by n bits per data comprising the steps of:

setting a basic period to have m ($m=2^n$) time slots ranging from 0 to m−1;

setting m+1 multilevels constituted by 0th to m−1th levels and a lower standard level below said 0th level;

constituting m data per group in accordance with said multilevel signal per said basic period;

defining said basic period as A type basic period and B type basic period alternately in series;

detecting a maximum value of said multilevel signal in said A type basic period and detecting a minimum value of said multilevel signal in said B type basic period;

generating m+1 standard levels based on a difference between said minimum value and said maximum value so as to quantize said multilevel signal;

deciding each level value $L_j$ of said multilevel signal in respective said time slot based on said m+1 standard levels;

detecting a time slot number T of said maximum value in said basic period when said basic period is said A type basic period and detecting a time slot number T of said minimum value in said basic period when said basic period is said B type basic period;

defining said time slot number T as a value of said index data;

converting said index data into said binary data which is located at kth position from a beginning of a group; and converting respective said level value $L_j$ of said multilevel signal except said Tth time slot in said basic period into respective said binary data which is located at respective position of said group corresponding to said respective time slot, said binary data having value $L_j+1$ given by shifting up said level value $L_j$ of said multilevel signal by one level when said basic period is said A type period and having value $L_j$ without shifting when said basic period is said B type period.

5. A conversion method of binary data constituted by n bits per data into a multilevel signal comprising the steps of:

setting a basic period to have m ($m=2^n$) time slots ranging from 0 to m−1;

setting m+2 multilevels constituted by 0th to m−1th level, an lower standard level below said 0th level, and an upper standard level above said m−1th level;

defining said basic period as A type basic period and B type basic period alternately in series;

constituting m data per group in accordance with said basic period;

defining a value of index data appearing kth from the beginning of said group as time index value T and defining values of m−1 normal data j except said index data as level value $L_j$;

converting said index data into said multilevel signal in Tth time slot of said basic period, said multilevel signal having lower standard level when said basic period is said A type period and having said upper standard level when said basic period is said B type period;

allocating respective said normal data j to each of corresponding said time slots except one for said index data, and converting respective said normal data j into said multilevel signal in corresponding respective said time slot of said basic period, said multilevel signal having respective $L_j$ level without being shifted.

6. A inverse conversion method of a multilevel signal into binary data constituted by n bits per data comprising the steps of:

setting a basic period to have m ($m=2^n$) time slots ranging from 0 to m−1;

setting m+2 multilevels constituted by 0th to m−1th levels, a lower standard level below said 0th level, and an upper standard level above said m−1th level;

constituting m data per group in accordance with said multilevel signal per said basic period;

defining said basic period as A type basic period and B type basic period alternately in series;

detecting a minimum value of said multilevel signal in said A type basic period and detecting a maximum value of said multilevel signal in said B type basic period;

generating m−2 standard levels based on a difference between said minimum value and said maximum value so as to quantize said multilevel signal;

deciding each level value $L_j$ of said multilevel signals based on said m+2 standard levels;

detecting a time slot number T of said minimum value in said basic period when said basic period is said A type basic period and detecting a time slot number T of said maximum value in said basic period when said basic period is said B type basic period;

defining said time slot number T as a value of said index data;

converting said index data into said binary data which is located at kth position from a beginning of a group; and converting respective said level value $L_j$ of said multilevel signal except said Tth time slot in said basic period into respective said binary data which is located at respective position of said group corresponding to said respective time slot, said binary data having value $L_j$ without shifting.

7. A communication method utilizing conversion method of claim 1 comprising the steps of;

modulating a carrier of a predetermined frequency by said multilevel signal; and transmitting a modulated multilevel signal into a transmission line.

8. A communication method utilizing conversion method of claim 2 comprising the steps of;

modulating a carrier of a predetermined frequency by said multilevel signals; and transmitting a modulated multilevel signal into a transmission line.

9. A communication method utilizing conversion method of claim 5 comprising the steps of;

modulating a carrier of a predetermined frequency by said multilevel signals; and transmitting a modulated multilevel signal into a transmission line.

10. A communication method utilizing inverse conversion method of claim 3 comprising the steps of;

receiving a modulated multilevel signal from a transmission line; and demodulating said modulated multilevel signal into said binary data, said modulated multilevel signal being given by modulating a carrier of a predetermined frequency by said multilevel signal.

11. A communication method utilizing inverse conversion method of claim 4 comprising the steps of;

receiving a modulated multilevel signal from a transmission line; and demodulating said modulated multilevel signal into said binary data, said modulated multilevel signal being given by modulating a carrier of a predetermined frequency by said multilevel signal.

12. A communication method utilizing inverse conversion method of claim 6 comprising the steps of;

receiving a modulated multilevel signal from a transmission line; and demodulating said modulated multilevel signal into said binary data, said modulated multilevel signal being given by modulating a carrier of a predetermined frequency by said multilevel signal.

13. A receiving device utilizing communication method of claim 7 comprising:

an amplifier so as to receive said multilevel signal transmitted through said transmission line;

a maximum/minimum value detection means detecting a minimum voltage value of said multilevel signal in said A type basic period and a maximum voltage value of said multilevel signal in said B type basic period; and an amplification factor controller so as to retain a constant voltage difference between said minimum voltage value and said maximum voltage value.

14. A receiving device utilizing communication method of claim 8 comprising:

an amplifier so as to receive said multilevel signal transmitted through said transmission line;

a maximum/minimum value detection means detecting a maximum voltage value of said multilevel signal in said A type basic period and a minimum voltage value of said multilevel signal in said B type basic period; and an amplification factor controller so as to retain a constant voltage difference between said minimum voltage value and said maximum voltage value.

15. A receiving device utilizing communication method of claim 9 comprising:

an amplifier so as to receive said multilevel signal transmitted through said transmission line;

a maximum/minimum value detection means detecting a minimum voltage value of said multilevel signal in said A type basic period and a maximum voltage value of said multilevel signal in said B type basic period; and an amplification factor controller so as to retain a constant voltage difference between said minimum voltage value and said maximum voltage value.

16. A receiving device utilizing communication method of claim 7 comprising:

a synchronizing index signal detection means detecting a synchronizing index signal at the timing when said multilevel signal takes a minimum voltage value in said A type basic period and at the timing when said multilevel signal takes a maximum voltage value in said B type basic period;

a synchronizing signal generating means generating a synchronizing signal so as to provide a sampling timing of said multilevel signal in respective said time slots by phase-locking said synchronizing signal to said synchronizing index signal; and a sampling means sampling said multilevel signal based on said sampling timing provided by said synchronizing signal.

17. A receiving device utilizing communication method of claim 8 comprising:

a synchronizing index signal detection means detecting a synchronizing index signal at the timing when said multilevel signal takes a maximum voltage value in said A type basic period and at the timing when said multilevel signal takes a minimum voltage value in said B type basic period;

a synchronizing signal generating means generating a synchronizing signal so as to provide a sampling timing of said multilevel signal in respective said time slots by phase-locking said synchronizing signal to said synchronizing index signal; and a sampling means sampling said multilevel signal based on said sampling timing provided by said synchronizing signal.

18. A receiving device utilizing communication method of claim 9 comprising:

a synchronizing index signal detection means detecting a synchronizing index signal at the timing when said multilevel signal takes a minimum voltage value in said A type basic period and at the timing when said multilevel signal takes a maximum voltage value in said B type basic period;

a synchronizing signal generating means generating a synchronizing signal so as to provide a sampling timing of said multilevel signal in respective said time slots by phase-locking said synchronizing signal to said synchronizing index signal; and a sampling means sampling said multilevel signal based on said sampling timing provided by said synchronizing signal.

* * * * *